United States Patent [19]
Grossmann et al.

[11] 3,736,856
[45] June 5, 1973

[54] PHOTOGRAPHIC CAMERA

[75] Inventors: Walter Grossmann, Russikon; Kurt Thaddey, Buchs, Zurich, both of Switzerland

[73] Assignee: Ciba-Geigy Ag, Basel, Switzerland

[22] Filed: Feb. 23, 1971

[21] Appl. No.: 117,890

[30] Foreign Application Priority Data

Feb. 27, 1970 Switzerland..........................2946/70
Jan. 8, 1971 Switzerland.............................241/71

[52] U.S. Cl..................................................95/1.1
[51] Int. Cl..............................................G03b 17/24
[58] Field of Search................96/1.1, 12.5, 10 A, 96/1

[56] References Cited
UNITED STATES PATENTS

| | | | |
|---|---|---|---|
| 2,952,504 | 9/1960 | Path | 346/107 A |
| 3,603,974 | 9/1971 | Copeland | 95/1.1 X |
| 2,938,201 | 5/1960 | Thornton | 95/1.1 X |
| 3,565,524 | 2/1971 | Pabst et al. | 95/1 R X |
| 3,572,229 | 3/1971 | Hutto et al. | 95/12.2 |
| 2,322,044 | 6/1943 | McFarlane et al. | 95/10 A |

*Primary Examiner*—Samuel S. Matthews
*Assistant Examiner*—Kenneth C. Hutchison
*Attorney*—Pierce, Scheffler & Parker

[57] ABSTRACT

Apparatus for photographing stationary objects such as paintings comprises a mobile camera structure in which is located a principal objective lens for forming an image of the object to be photographed and an image receiving means such as film, and a stationary housing having an auxiliary objective lens for forming an image of a stationary reference object which is subject to the same illumination as the principal object. The fixed position housing containing the auxiliary objective lens is located spatially from the mobile camera structure and is coupled to the latter by means of a flexible light conductor which thus provides mobility for the camera and carries the image formed by the auxiliary objective lens into the camera for imaging on the film adjacent the image of the principal object. Either a single shutter or two separate synchronized shutters are used to expose a film in the image plane of the principal objective lens to the images formed by the principal and auxiliary objective lenses. Instead of a flexible light conductor the mobile camera structure and stationary housing for the auxiliary objective lines can be coupled by a flexible electric cable which transmits signals from photoelectric cells in the auxiliary objective lens housing and mounted behind the auxiliary objective lens to lamps mounted in the camera structure above the image plane of the principal objective lens.

8 Claims, 5 Drawing Figures

PATENTED JUN 5 1973

PHOTOGRAPHIC CAMERA

This invention relates to a photographic camera and particularly but not necessarily exclusively to a camera for use in copying paintings.

When taking photographs of objects particularly paintings for making reproductions, it is often the practice to photograph a reference object at the same time as photographing the painting, both the painting and the reference object being subject to the same illumination and imaging the reference object on the film alongside the edge of the image of the principal object i.e, the painting. A color plate or card or a grey scale may comprise the reference object so that the image of the reference object may be used when printing to control the exposure time and/or color match. When using an ordinary camera this method causes a number of difficulties. For example, for every fresh camera adjustment the reference object must be re-positioned firstly to ensure that it will be within the field of view of the camera lens and secondly that it will be outside the image of the principal object. It is very difficult to ensure that the images of the principal object and the reference object will always be in the same relative mutual positions on the film or plate. This results in separate manual adjustments being made to the printer for each negative to ensure correct registration of the reference image with the exposure control device of the printer and the image of the principal object with the main printing light path.

In accordance with this invention therefore we provide a photographic camera comprising :

A mobile camera structure including a principal objective lens for forming an image of a principal object on an image receiving means such as film within the camera, an auxiliary objective lens arranged within a stationary housing spatially separated from the mobile camera structure and which occupies a fixed position relative to a reference object illuminated from the same source of light as the principal object for forming an image of the reference object, flexible transmission means extending between the housing and the camera structure for transmitting the image of the reference object formed by the auxiliary objective lens into the mobile camera structure and onto the image receiving means adjacent the image of the principal object, and shutter means for controlling passage of the images formed respectively by the principal and auxiliary objective lens to the image receiving means.

In some previously known cameras the auxiliary lens is mounted in the body of the camera and hence participates in the movements of the principal lens when this is adjusted. In one known arrangement the auxiliary objective lens is mounted in a fixed position on an exchangeable rear panel of the camera, a directionally adjustable mirror being positioned between the reference object and the auxiliary objective lens. Any fresh adjustment of the principal objective lens entails a readjustment of the position of the auxiliary objective lens or the deflecting mirror, assuming the reference object is outside the camera and therefore does not participate in any realigning movement of the camera. Cameras equipped with an auxiliary objective as hitherto known to the applicant are therefore not much better suited to the above described photographic technique than ordinary cameras.

In the proposed camera as described herein with reference to preferred embodiments of the invention, the auxiliary objective lens forms a unit which is separate from the camera and is coupled thereto by a flexible image or light transmission line, which images the reference object adjacent the image of the principal object formed by the objective lens of the camera, the flexible transmission line affording a considerable degree of mobility for the first housing.

Figure 1:
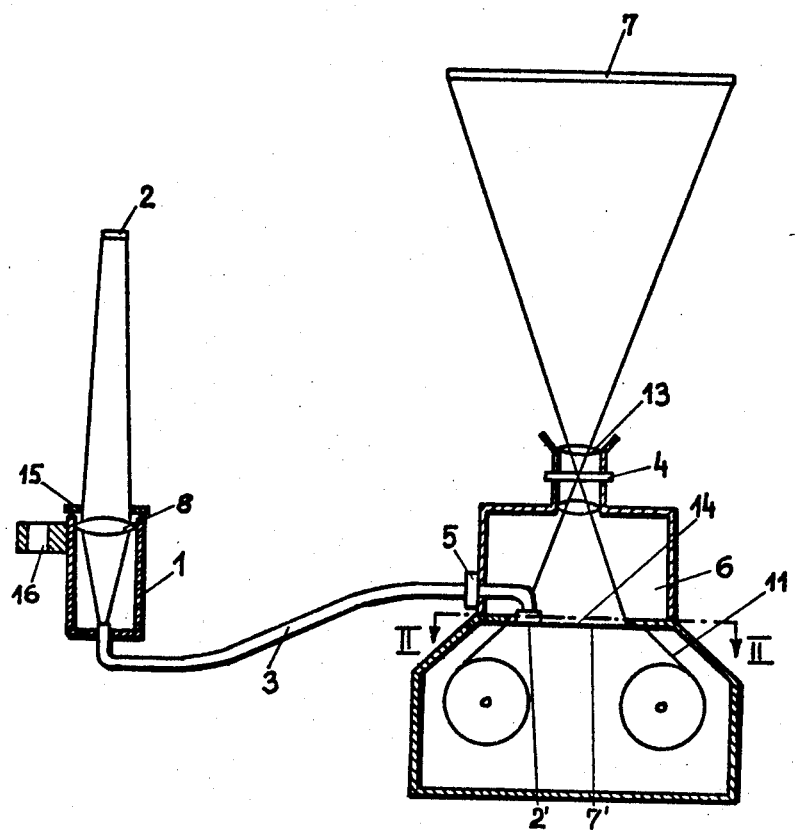
FIG. 1 illustrates in cross section a camera in accordance with the invention.

In FIG. 1 a photographic camera 6 is shown imaging an object 7 on a film 11 in an image plane 14 by a principal objective lens 13 when a shutter 4 is opened. The image plane will be hereinafter also referred to as the film plane. An auxiliary objective lens 8 in a housing 1 fitted with a view-finder 16 and pointing at a reference object 2 is connected to the camera 6 by a flexible light conductor 3. The auxiliary objective lens 8 which has an adjustable aperture 15 collects light emitted or reflected by the reference object 2 and focuses it on the end of the light conductor 3 whose other end is positioned over the film plane 14 in the camera 6. The flexible light conductor 3 in the illustrated embodiment passes through an auxiliary shutter 5 which is attached to the body of the camera. The two shutters 4 and 5 are synchronized. In a preferred modification (not shown) the two shutters may be replaced by a single shutter preferably a focal plane shutter operating immediately above the film plane 14. Alternatively, the auxiliary shutter may be inside the housing 1 in which is mounted the auxiliary objective lens 8.

Figure 2:
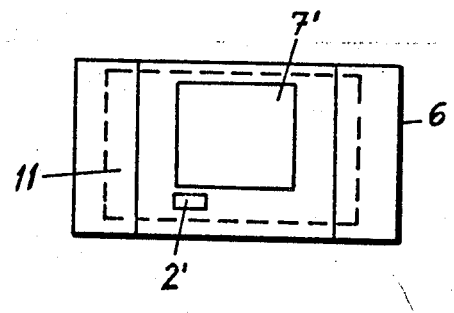
FIG. 2 is a section taken on the line II — II of FIG. 1.

With reference to FIG. 2 it will be seen that the image 2' of the reference object is transmitted by the flexible light conductor 3 inside the camera 6 to an area on the film that is outside the image area 7' of the principal objective lens 13. The image 2' formed by the auxiliary objective lens 8 is located alongside the image area 7' of the principal objective lens 13, the leading or trailing edges of the two images with respect to the direction of film transport, being in register.

Figure 3:
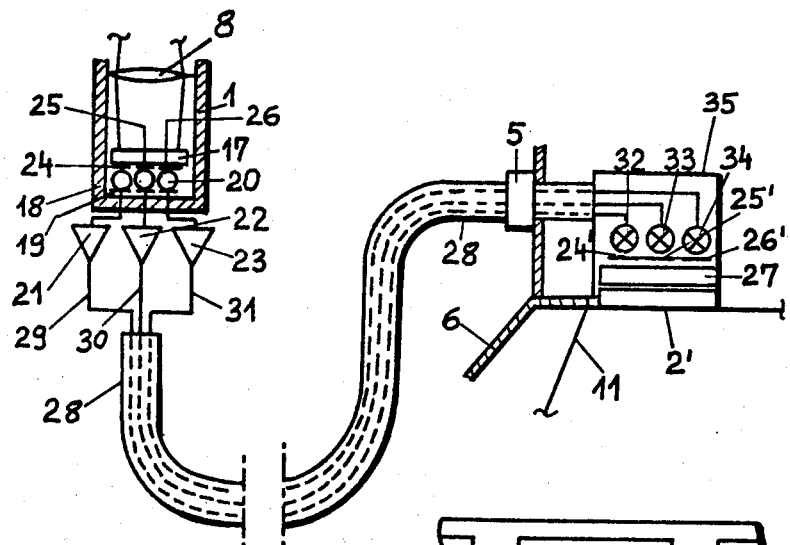
FIG. 3 shows a modification to the camera illustrated in FIG. 1.
Figure 4:
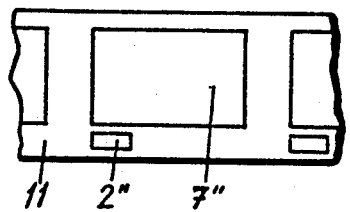
FIG. 4 shows part of a film exposed in the camera shown in FIG. 1.
Figure 5:
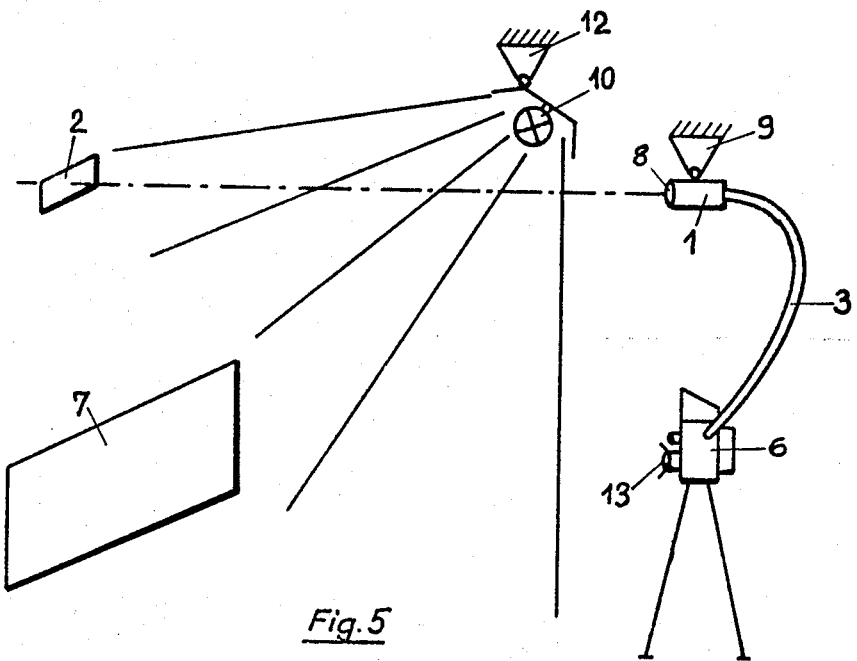
FIG. 5 shows a method of using the camera illustrated in FIG. 1.

In the embodiment shown in FIG. 3 light entering the auxiliary objective lens 8 is focused on three photocells 18, 19 and 20. In the path of the light between the photocells and the auxiliary objective lens is a ground glass screen 17, and blue, green, and red color filters 24, 25, 26 respectively. Each photocell therefore receives light of the color of its associated filter and produces an electrical signal representative of the incident light. The signals are each amplified in amplifiers 21, 22 and 23 and applied via conductors 29, 30 and 31, preferably combined in a flexible electric cable 28 to lamps 32, 33, 34 inside the camera 6. Each of these lamps illuminates a different one of the filters 24', 25', 26' which correspond in color to the filters 24, 25 and 26 respectively. Behind the filters is a ground glass screen 27 which passes the light emitted by the lamps 32, 33 and 34 to the image field 2' of the auxiliary objective lens 8. The assembly of lamps 32 to 34, filters 24' to 26' and ground glass screen 27 is enclosed within a light-tight housing 36 in the camera 6. The auxiliary shutter 5 in this embodiment may be located as in the embodiment according to FIG. 1. Alternatively the shutter for the auxiliary objective lens may comprise a timing circuit, synchronized with the shutter of the principal objective lens controlling the electrical signals produced by the photocells, amplifiers or associated circuits.

The use of the camera will now be described:
The auxiliary objective lens 8 is mounted at a fixed location inside the photographic studio and focused on the reference object which is likewise mounted at a fixed position in the studio. The camera and the principal object to be photographed are always so placed that the principal and reference object can be illuminated by the same light source. The flexibility of the light conductor or electric cable between the camera and the housing mounting the auxiliary objective lens allows the camera a considerable degree of mobility but the size of the image of the reference object and its position in relation to the image of the principal object always remains the same. The shutter speed of the auxiliary objective lens is so controlled that the image of the reference object on the film has the same density as it would have if it were imaged by the principal objective lens. When this is the case the density of the resultant image of the reference object will not depend upon the distance between the reference object and the auxiliary objective lens, which generally differs in different studios. Processing in a laboratory serving several studios is thereby simplified because the color density of the reference object is a measure of the illumination of the reference object and hence of the principal object, and therefore no corrections are required. Besides this advantage other benefits are secured in film processing. For the production of prints from negatives, automatic copying machines, usually called printers, are generally used. In these printers the negatives from which prints are required are positioned in relation to a measuring device, the negative being illuminated from one side and the intensity of the transmitted colors red, green and blue measured on the other side. In a conventional manner the exposure times applicable to the three colors are determined accordingly. The negatives are mounted on a platform which the operator can keep under observation, whereas the light-measuring elements, such as photocells, photoresistors, photoelements and so forth are contained in a light-tight part of the printer to protect them from incident external stray light. Nevertheless, when using these printers in illuminated interiors the proportion of outside light that falls on the negatives and that is reflected by them into the measuring devices is included in the measurement. If the proposed camera and a reference object of a suitable color are used, such as a flesh-colored plate for portraiture, the measurement of the intensity of the light transmitted by the negative is reduced to a measurement of the intensity of the light transmitted through the image of the reference object. Because of the smallness of the surface area that has to be measured, the light measuring elements may be located directly above the film or associated therewith by a light conductor. In both cases screening from incident external light can be provided without any difficulty and errors in exposure time due to extraneous light obviated. Another problem which cannot be solved in conventional printers with films exposed in normal cameras otherwise than by providing extremely complex and expensive devices is that of location of the negatives in the printer. For solving this problem so-called film-notchers are used which scan the film by reference to image fields and/or frames deducting therefrom the position of an image field and providing one edge of each image field with a notch which is engaged by a locating pin in the printer. When using the proposed camera, film-notchers are redundant because location in the printer can be effected by reference to one of the transverse edges of the images of the reference object and of the principal objects, which are always in alignment because of the invariant relative positions of the two images. For scanning these edges a simple photoelectric detector is entirely sufficient. Another important advantage in the running of a photographic laboratory is that when prints are re-ordered the image of the reference object can be referred to again as a standard, thereby eliminating the necessity of making records and making adjustments to the exposure parameters. The image of the reference object is not printed when prints are made from the principal image.

What is claimed is:

1. Apparatus for photographing a stationary principal object together with a stationary reference object illuminated from the same source of light comprising a mobile camera including therein a principal objective lens for forming an image of the principal object on an image receiving means such as film within said camera, an auxiliary objective lens arranged within a stationary housing spatially separated from said mobile camera and which occupies a fixed position relative to said reference object for forming an image of the latter, flexible transmission means extending between said housing and said camera for transmitting the image of the reference object formed by said auxiliary objective lens into said mobile camera and onto said image receiving means adjacent the image of the principal object, and shutter means for controlling the passage of the images formed respectively by said principal and auxiliary objective lens to said image receiving means.

2. Photographic apparatus as defined in claim 1 wherein said transmission means for the image of the reference object formed by said auxiliary objective lens is constituted by a flexible light conductor and wherein said shutter means controlling the passage of the image formed by said auxiliary objective lens to said image receiving means is constituted by a shutter located on said camera and which functions to control the passage of light through said light conductor.

3. Photographic apparatus as defined in claim 1 wherein said transmission means for the image of the reference object formed by said auxiliary objective lens is constituted by a flexible light conductor and wherein said shutter means comprises a focal plane shutter mounted adjacent said image receiving means and which is operable to expose both the image of the principal object and the reference object to said image receiving means.

4. Photographic apparatus as defined in claim 1 wherein said transmission means for the image of the reference object formed by said auxiliary objective lens includes photosensitive means mounted within said housing and to which the image of the reference object is transferred from said auxiliary objective lens, a light source within said camera, and a flexible electrical connection extending between said photosensitive means and said light source for controlling the intensity thereof in accordance with the magnitude of the response of said photosensitive means.

5. Photographic apparatus as defined in claim 4 wherein said photosensitive means comprises a plurality of photoelectric cells and a corresponding plurality of different colored filters mounted between said photoelectric cells and said auxiliary objective lens, and said light source comprises a plurality of lamps and a corresponding plurality of filters each having the same color as a different one of the filters comprising said photosensitive means, said electrical connection including amplifiers and flexible electrical conductor means connecting each one of said photoelectric cells to a different one of said lamps.

6. Photographic apparatus as defined in claim 5 including a light-tight box housing said plurality of lamps, and a ground glass screen mounted between said lamps and said image receiving means.

7. Photographic apparatus as defined in claim 4 wherein said shutter means includes means for interrupting the electrical connection between said photosensitive means and said light source for a predetermined period of time, and a shutter for passing the image of the principal object formed by said principal objective lens to said image receiving means.

8. Photographic apparatus as defined in claim 1 wherein said principal objective lens and said transmission means are mounted within said camera such that one edge of the respective images of the principal and reference objects are aligned.

* * * * *